US012603073B2

(12) United States Patent
Kimura

(10) Patent No.: US 12,603,073 B2
(45) Date of Patent: Apr. 14, 2026

(54) ELECTRONIC PERCUSSION INSTRUMENT, CONTROL DEVICE FOR ELECTRONIC PERCUSSION INSTRUMENT, AND CONTROL METHOD THEREFOR

(71) Applicant: Roland Corporation, Shizuoka (JP)

(72) Inventor: Toshiharu Kimura, Hamamatsu (JP)

(73) Assignee: Roland Corporation, Shizuoka (JP)

( * ) Notice: Subject to any disclaimer, the term of this patent is extended or adjusted under 35 U.S.C. 154(b) by 660 days.

(21) Appl. No.: 17/788,310

(22) PCT Filed: Dec. 27, 2019

(86) PCT No.: PCT/JP2019/051606
§ 371 (c)(1),
(2) Date: Jun. 23, 2022

(87) PCT Pub. No.: WO2021/131070
PCT Pub. Date: Jul. 1, 2021

(65) Prior Publication Data
US 2023/0037059 A1 Feb. 2, 2023

(51) Int. Cl.
*G10H 3/14* (2006.01)
*G10H 1/00* (2006.01)

(52) U.S. Cl.
CPC ............... *G10H 3/146* (2013.01); *G10H 1/00* (2013.01); *G10H 2220/525* (2013.01); *G10H 2230/275* (2013.01)

(58) Field of Classification Search
CPC .... G10H 3/146; G10H 1/00; G10H 2220/525; G10H 2230/275
See application file for complete search history.

(56) References Cited

U.S. PATENT DOCUMENTS 5,406,022 A 4/1995 Kobayashi
5,422,430 A 6/1995 Ikeya et al.
5,478,968 A * 12/1995 Kitagawa ............ G10H 1/0091 84/630

(Continued)

FOREIGN PATENT DOCUMENTS

CN 101410887 4/2009
CN 206148128 5/2017
CN 107438880 12/2017

(Continued)

OTHER PUBLICATIONS

"Search Report of Europe Counterpart Application", issued on Jul. 21, 2023, p. 1-p. 8.

(Continued)

*Primary Examiner* — Jeffrey Donels
*Assistant Examiner* — Philip G Scoles
(74) *Attorney, Agent, or Firm* — JCIPRNET

(57) ABSTRACT

This control device for an electronic percussion instrument inputs a musical sound signal corresponding to a hit on a struck surface to a first amplifier for amplifying a signal to be connected to a first speaker disposed on the back side of or around the struck surface, and inputs the musical sound signal to a second amplifier for amplifying a signal to be connected to a second speaker disposed on the back side of or around a first struck surface at a timing later than a timing at which the musical sound signal is inputted to the first amplifier.

15 Claims, 9 Drawing Sheets

(56) References Cited

U.S. PATENT DOCUMENTS

| | | | | |
|---|---|---|---|---|
| 2009/0241761 | A1 | 10/2009 | Hotta et al. | |
| 2016/0035240 | A1* | 2/2016 | Camp | G09B 15/00 84/470 R |

FOREIGN PATENT DOCUMENTS

| | | | | |
|---|---|---|---|---|
| CN | 109119055 | | 1/2019 | |
| JP | H0580754 | | 4/1993 | |
| JP | H09297576 | | 11/1997 | |
| JP | H09297576 | A * | 11/1997 | G10H 1/00 |
| JP | 2001255871 | | 9/2001 | |
| JP | 2007183349 | | 7/2007 | |
| JP | 2009210597 | | 9/2009 | |

OTHER PUBLICATIONS

"International Search Report (Form PCT/ISA/210) of PCT/JP2019/051606," mailed on Mar. 10, 2020, with English translation thereof, pp. 1-4.

"Office Action of China Counterpart Application", with English translation thereof, issued on Apr. 3, 2025, pp. 1-25.

"Office Action of China Counterpart Application", issued on Aug. 2, 2025, with English translation thereof, p. 1-p. 23.

* cited by examiner (A)

(B)

(A)

(B)

First method

| Localization (set by user) | L15 | L14 | L13 | L12 | L11 | L10 | L 9 | L 8 | L 7 | L 6 | L 5 | L 4 | L 3 | L 2 | L 1 |
|---|---|---|---|---|---|---|---|---|---|---|---|---|---|---|---|
| Volume setting (Lch) | 100 | 98 | 96 | 94 | 93 | 91 | 89 | 87 | 85 | 83 | 81 | 79 | 77 | 74 | 72 |
| Volume setting (Rch) | 0 | 8 | 17 | 23 | 30 | 35 | 41 | 46 | 50 | 53 | 57 | 60 | 63 | 66 | 68 |
| Auditory perception volume (measurement value) | 80.0 | 80.2 | 80.5 | 80.8 | 81.1 | 81.3 | 81.6 | 81.9 | 82.1 | 82.4 | 82.7 | 82.9 | 83.2 | 83.5 | 83.7 |
| Auditory perception localization (distance from center) | 150 | 140 | 130 | 120 | 110 | 100 | 90 | 80 | 70 | 60 | 50 | 40 | 30 | 20 | 10 |

| CTR | R 1 | R 2 | R 3 | R 4 | R 5 | R 6 | R 7 | R 8 | R 9 | R10 | R11 | R12 | R13 | R14 | R15 |
|---|---|---|---|---|---|---|---|---|---|---|---|---|---|---|---|
| 70 | 68 | 66 | 63 | 60 | 57 | 53 | 50 | 46 | 41 | 35 | 30 | 23 | 17 | 8 | 0 |
| 70 | 72 | 74 | 77 | 79 | 81 | 83 | 85 | 87 | 89 | 91 | 93 | 94 | 96 | 98 | 100 |
| 84.0 | 83.7 | 83.5 | 83.2 | 82.9 | 82.7 | 82.4 | 82.1 | 81.9 | 81.6 | 81.3 | 81.1 | 80.8 | 80.5 | 80.2 | 80.0 |
| 0 | 10 | 20 | 30 | 40 | 50 | 60 | 70 | 80 | 90 | 100 | 110 | 120 | 130 | 140 | 150 |

mm

FIG. 5

This method

| Localization (set by user) | L15 | L14 | L13 | L12 | L11 | L10 | L 9 | L 8 | L 7 | L 6 | L 5 | L 4 | L 3 | L 2 | L 1 |
|---|---|---|---|---|---|---|---|---|---|---|---|---|---|---|---|
| Delay time (Lch) | 0 | 0 | 0 | 0 | 0 | 0 | 0 | 0 | 0 | 0 | 0 | 0 | 0 | 0 | 0 |
| Delay time (Rch) | 0.68 | 0.63 | 0.59 | 0.54 | 0.50 | 0.45 | 0.41 | 0.36 | 0.32 | 0.27 | 0.23 | 0.18 | 0.14 | 0.09 | 0.05 |
| Volume setting (Lch) | 100 | 100 | 100 | 100 | 100 | 100 | 100 | 100 | 100 | 100 | 100 | 100 | 100 | 100 | 100 |
| Volume setting (Rch) | 100 | 100 | 100 | 100 | 100 | 100 | 100 | 100 | 100 | 100 | 100 | 100 | 100 | 100 | 100 |
| Auditory perception volume (measurement value) | 82.8 | 83.1 | 83.5 | 83.8 | 84.2 | 84.5 | 84.9 | 85.2 | 85.6 | 86 | 86.3 | 86.7 | 87 | 87.4 | 87.7 |
| Auditory perception localization (distance from center) | 150 | 140 | 130 | 120 | 110 | 100 | 90 | 80 | 70 | 60 | 50 | 40 | 30 | 20 | 10 |

| CTR | R 1 | R 2 | R 3 | R 4 | R 5 | R 6 | R 7 | R 8 | R 9 | R10 | R11 | R12 | R13 | R14 | R15 | |
|---|---|---|---|---|---|---|---|---|---|---|---|---|---|---|---|---|
| 0 | 0.05 | 0.09 | 0.14 | 0.18 | 0.23 | 0.27 | 0.32 | 0.36 | 0.41 | 0.45 | 0.50 | 0.54 | 0.59 | 0.63 | 0.68 | ms |
| 0 | 0 | 0 | 0 | 0 | 0 | 0 | 0 | 0 | 0 | 0 | 0 | 0 | 0 | 0 | 0 | |
| 100 | 100 | 100 | 100 | 100 | 100 | 100 | 100 | 100 | 100 | 100 | 100 | 100 | 100 | 100 | 100 | |
| 100 | 100 | 100 | 100 | 100 | 100 | 100 | 100 | 100 | 100 | 100 | 100 | 100 | 100 | 100 | 100 | |
| 88.1 | 87.7 | 87.4 | 87 | 86.7 | 86.3 | 86 | 85.6 | 85.2 | 84.9 | 84.5 | 84.2 | 83.8 | 83.5 | 83.1 | 82.8 | |
| 0 | 10 | 20 | 30 | 40 | 50 | 60 | 70 | 80 | 90 | 100 | 110 | 120 | 130 | 140 | 150 | mm |

FIG. 7

ELECTRONIC PERCUSSION INSTRUMENT, CONTROL DEVICE FOR ELECTRONIC PERCUSSION INSTRUMENT, AND CONTROL METHOD THEREFOR

CROSS-REFERENCE TO RELATED APPLICATION

This application is a 371 application of the International PCT application serial no. PCT/JP2019/051606, filed on Dec. 27, 2019. The entirety of the above-mentioned patent applications is hereby incorporated by reference herein and made a part of this specification.

TECHNICAL FIELD

The disclosure relates to an electronic percussion instrument, a control device for the electronic percussion instrument, and a control method therefor.

RELATED ART

Conventionally, there is an electronic drum device provided with a speaker. (See, for example, Patent Literature 1)

CITATION LIST

Patent Literature

It is desirable to localize the sound image so that the sound comes from the struck surface that has been hit. However, in the conventional technology, such a point has not been taken into consideration.

[Patent Literature 1] Japanese Patent Lain-Open No. H9-297576

SUMMARY

The disclosure provides an electronic percussion instrument, a control device for the electronic percussion instrument, and a control method for localizing a sound image so that a sound can be heard from a tapped place.

Solution to Problem

An embodiment of the disclosure provides an electronic percussion instrument including:

- a first struck surface;
- a first speaker disposed on a back side of or around the first struck surface;
- a second speaker disposed on the back side of or around the first struck surface;
- a first generation part that generates a first musical sound signal corresponding to a hit of the first struck surface;
- a first amplifier that amplifies the input first musical sound signal and connects with the first speaker;
- a second amplifier that amplifies the input first musical sound signal and connects with the second speaker; and
- a first delay circuit that delays the first musical sound signal input to the second amplifier so that the first musical sound signal is input to the second amplifier at a timing later than a timing of being input to the first amplifier.

Further, an embodiment of the disclosure provides a control device for an electronic percussion instrument including a first struck surface, and the control device includes:

- a first generation part that generates a first musical sound signal corresponding to a hit of the first struck surface; and
- a first delay circuit that delays the input first musical sound signal,
- wherein the first musical sound signal is input to a first amplifier that amplifies a signal to be connected to a first speaker disposed on a back side of or around the first struck surface, and is input to a second amplifier that amplifies a signal to be connected to a second speaker disposed on the back side of or around the first struck surface at a timing later than a timing of being input to the first amplifier by the first delay circuit.

Further, an embodiment of the disclosure provides a control method for an electronic percussion instrument, in which a control device for the electronic percussion instrument including a first struck surface performs:

- generating a first musical sound signal corresponding to a hit of the first struck surface;
- inputting the first musical sound signal to a first amplifier that amplifies a signal to be connected to a first speaker disposed on a back side of or around the first struck surface, and inputting the first musical sound signal to a second amplifier that amplifies a signal to be connected to a second speaker disposed on the back side of or around the first struck surface at a timing later than a timing of being input to the first amplifier.

Further, an embodiment of the disclosure provides an electronic percussion instrument including:

- a struck surface;
- a first speaker and a second speaker that emit a musical sound based on a musical sound signal corresponding to a hit of the struck surface;
- a delay circuit that gives a delay time to the musical sound signal connected to the second speaker and delays a timing of connecting the musical sound signal to the second speaker from a timing of connecting the musical sound signal to the first speaker; and
- a control device that sets the delay time for setting a localization of a sound image of the musical sound emitted from the first speaker and the second speaker.

BRIEF DESCRIPTION OF THE DRAWINGS

FIG. 5 is a table showing the experimental results of a first method.

FIG. 7 is a table showing the experimental results of a second method.

DESCRIPTION OF THE EMBODIMENTS

An electronic percussion instrument according to an embodiment includes the following.

(1) a first struck surface;

(2) a first speaker disposed on a back side of or around the first struck surface;
(3) a second speaker disposed on the back side of or around the first struck surface;
(4) a first generation part that generates a first musical sound signal corresponding to a hit of the first struck surface;
(5) a first amplifier that amplifies the input first musical sound signal and connects with the first speaker;
(6) a second amplifier that amplifies the input first musical sound signal and connects with the second speaker; and
(7) a first delay circuit that delays the first musical sound signal input to the second amplifier so that the first musical sound signal is input to the second amplifier at a timing later than a timing of being input to the first amplifier.

According to the electronic percussion instrument, it is possible to obtain an auditory perception that the sound is emitted from the place where the sound is struck. The electronic percussion instrument according to the embodiment may adopt a configuration further including: a second struck surface disposed side by side with the first struck surface and having the second speaker disposed on a back side of or around the second struck surface; a second generation part that generates a second musical sound signal corresponding to a hit of the second struck surface; and a second delay circuit that delays the second musical sound signal input to the first amplifier so that the second musical sound signal is input to the first amplifier at a timing later than a timing of being input to the second amplifier.

In the electronic percussion instrument of the embodiment, a configuration may be adopted in which each of the first speaker and the second speaker emits a musical sound based on the first musical sound signal or based on each of the first musical sound signal and the second musical sound signal at a same volume, regardless of a hit position of the first struck surface and the second struck surface. In this case, it is possible to obtain an auditory perception in which the sound is heard loudly.

In the electronic percussion instrument according to the embodiment, it is preferable to adopt a configuration in which the first struck surface and the second struck surface are disposed side by side in a left-right direction. However, the direction in which the first struck surface and the second struck surface are disposed is not limited to the left-right direction. The first struck surface and the second struck surface may be disposed horizontally at the same height, for example, but may be tilted at the same angle or different angles. Further, the first struck surface and the second struck surface may be disposed at different heights.

Figure 1:
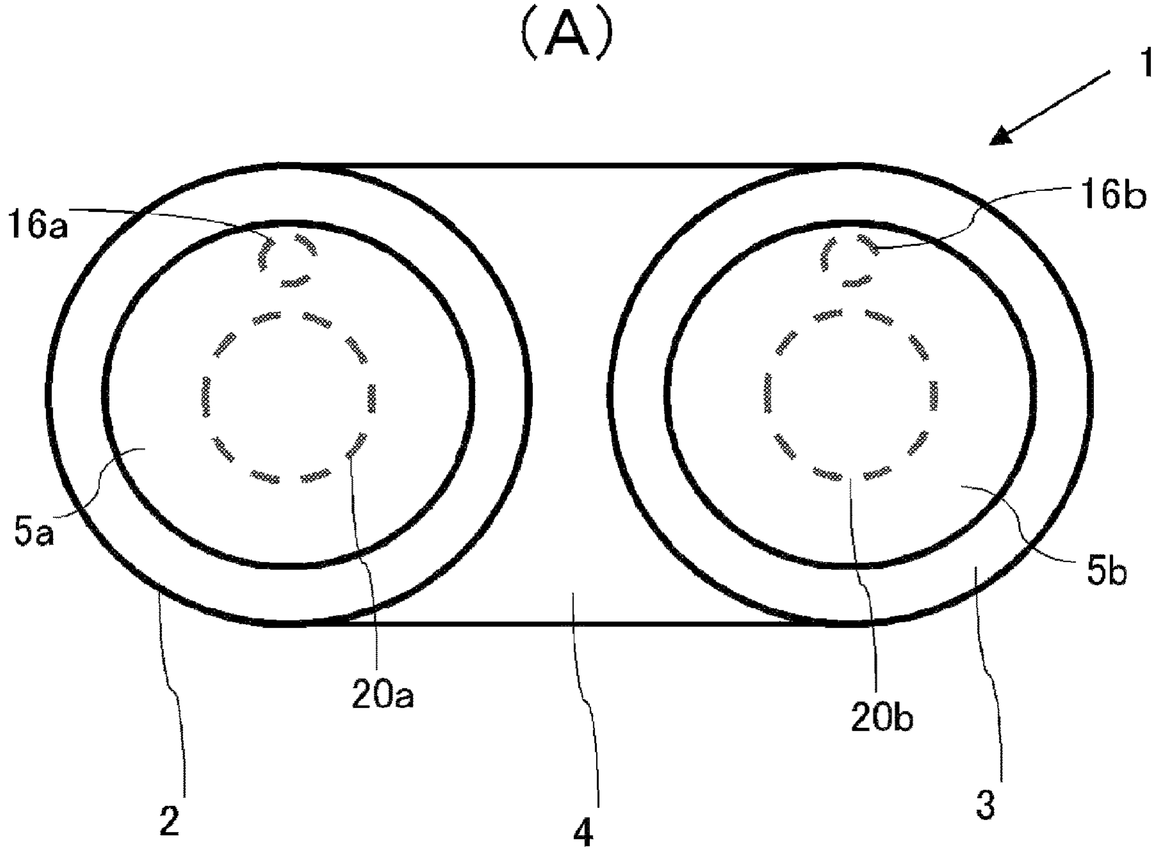
In FIG. 1, (A) and (B) show a configuration example of an electronic percussion instrument according to an embodiment.
Figure 1:
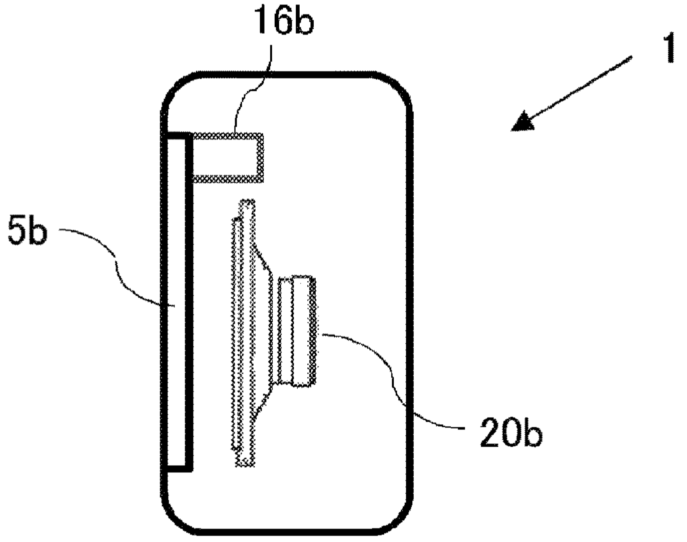

Hereinafter, embodiments of an electronic percussion instrument, a control device for the electronic percussion instrument, and a control method will be described with reference to the drawings. The configuration of the embodiment is an example, and the disclosure is not limited to the configuration of the embodiment. In FIG. 1, (A) shows a plan view of an electronic percussion instrument 1 according to the embodiment, and (B) schematically shows the right side surface of the electronic percussion instrument 1.

The electronic percussion instrument 1 is an electronic musical instrument having a struck surface (pad) that vibrates when hit by a hand or a stick. Percussion instruments include bass drums, snare drums, Japanese drums, drums, cajons, and the like. In FIG. 1, the electronic percussion instrument 1 has a configuration in which a housing 2 disposed on the left side and a housing 3 disposed on the right side are connected by a connecting part 4. Each of the housing 2 and the housing 3 is formed in a circular shape in a plane, and a circular struck surface is formed on the upper surface thereof by stretching an elastic member.

The housing 2 on the left side has a struck surface 5*a*. The housing 3 on the right side has a struck surface 5*b*. The struck surface 5*a* and the struck surface 5*b* are disposed in the left-right direction with respect to the performer (user) so as to be symmetrical in the left-right direction with respect to the performer.

The inside of the housing 2 and the housing 3 is hollow. Inside the housing 2 (the back side of the struck surface 5*a*), a piezo sensor (also called a piezoelectric sensor or a piezoelectric element) 16*a* that converts the vibration of the struck surface 5*a* into an electric signal and a speaker 20*a* are fixedly disposed. Similarly, inside the housing 3 (the back side of the struck surface 5*b*), a piezo sensor 16*b* that converts the vibration of the struck surface 5*b* into an electric signal and a speaker 20*b* are disposed. The speakers 20*a* and 20*b* may be disposed around each of the struck surfaces 5*a* and 5*b*, but by disposing them on the back side of the struck surface in the housing, the electronic percussion instrument 1 can be made smaller, and the musical sound can be effectively heard even by using a small speaker. In this embodiment, as an example, the struck surfaces 5*a* and 5*b* are each made of a mesh-shaped material, so that the sound emitted from the speakers 20*a* and 20*b* may easily pass through. In this embodiment, an electronic percussion instrument having two struck surfaces will be described. However, the electronic musical instrument may be an electronic percussion instrument having one struck surface with first and second speakers disposed around the struck surface. At least one of the first and second speakers may be disposed on the back side of the struck surface.

Figure 2:
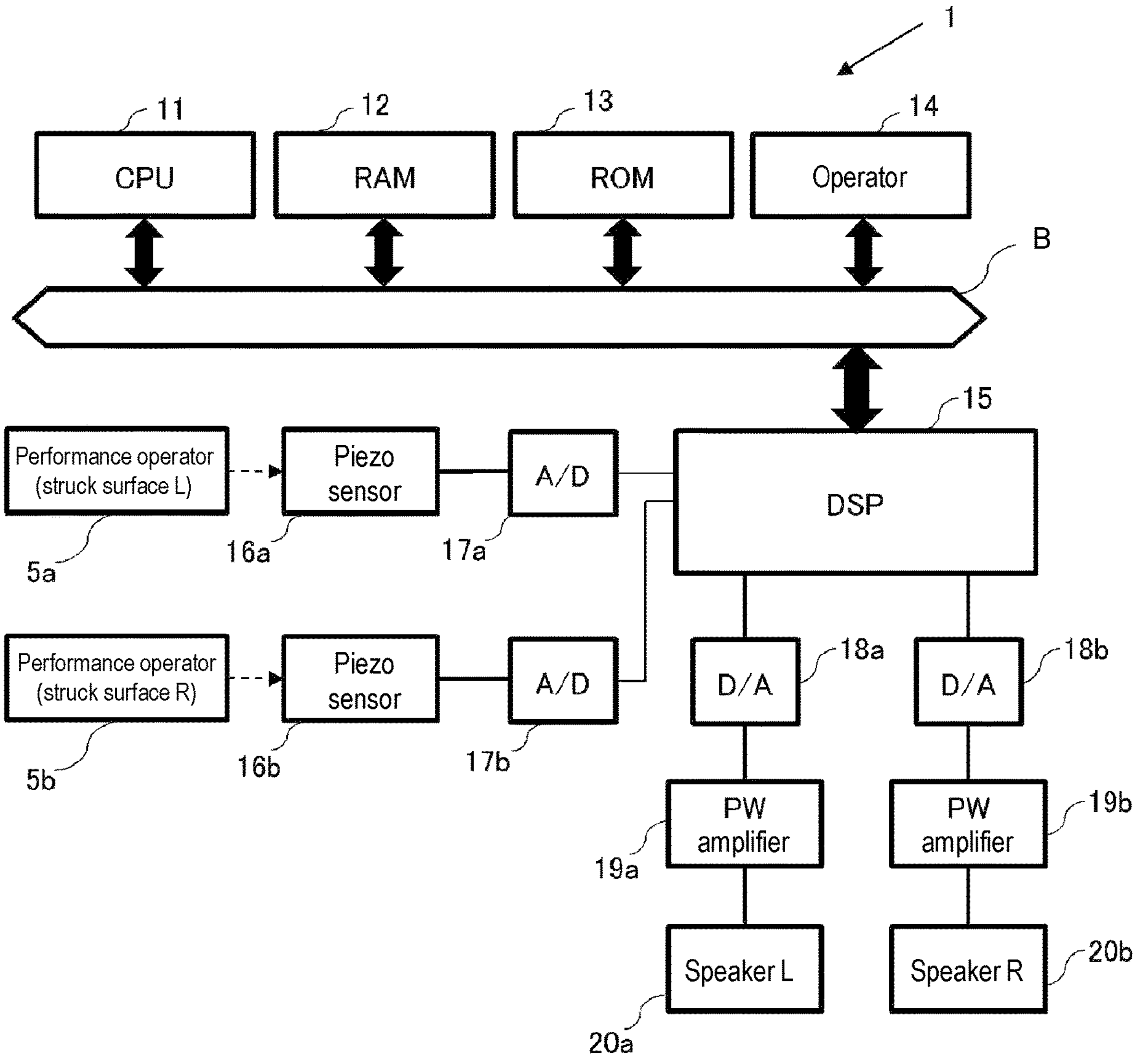
FIG. 2 shows an example of a circuit configuration of the electronic percussion instrument.

FIG. 2 shows an example of a circuit configuration of the electronic percussion instrument 1. In FIG. 2, the electronic percussion instrument 1 includes a central processing unit (CPU) 11 that controls the overall operation. The CPU 11 is connected to a random access memory (RAM) 12, a read only memory (ROM) 13, an operator 14 and a digital signal processor (DSP) 15 via a bus B. The combination of the CPU 11, the RAM 12, the ROM 13, and the DSP 15 operates as a "control device (control circuit) for the electronic percussion instrument." However, the processing performed by the CPU 11 or the DSP 15 may be performed by an integrated circuit such as an ASIC or an FPGA.

The RAM 12 is used as a work area of the CPU 11 and a storage area for programs and data. The ROM 13 is used as a storage area for programs and data. The RAM 12 and the ROM 13 are examples of a storage device (storage medium). The operator 14 is a key, a button, a knob, a switch, or the like for inputting or setting various information such as setting information related to the electronic percussion instrument 1. Further, a sensor for detecting a predetermined physical quantity may be provided.

As described above, the electronic percussion instrument 1 includes the struck surface 5*a* on the left side, which is a performance operator, and the piezo sensor 16*a* that detects the vibration of the struck surface 5*a*. The electric signal indicating the vibration of the struck surface 5*a* detected by the piezo sensor 16*a* is converted into a digital signal by an A/D converter 17*a* and input to the DSP 15. Further, the electronic percussion instrument 1 includes the struck surface 5*b* on the right side, which is a performance operator, and the piezo sensor 16*b* that detects the vibration of the struck surface 5*b*. The electric signal indicating the vibration of the striking surface 5*b* detected by the piezo sensor 16*b* is converted into a digital signal by an A/D converter 17*b* and input to the DSP 15.

Figure 3:
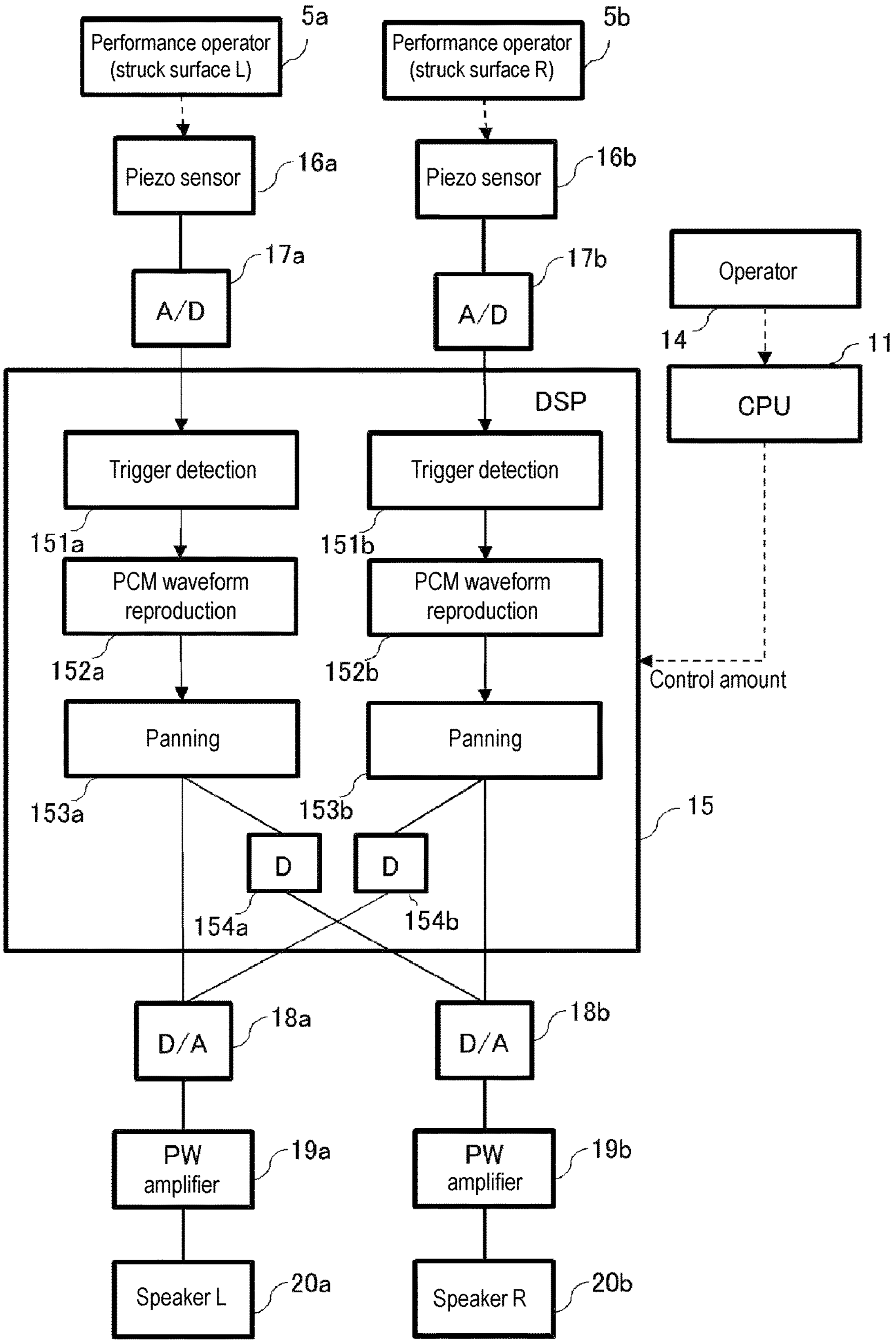
FIG. 3 is an illustration diagram of a configuration for localizing a sound image.

As shown in FIG. 3, the DSP 15 performs a trigger detection 151*a* that detects a trigger (hit of the struck surface 5*a*) from a digital signal input from the A/D converter 17*a*, and a pulse code modulation (PCM) waveform reproduction 152*a* that reproduces a PCM waveform (musical sound signal) corresponding to the digital signal. That is, in the PCM waveform reproduction 152*a*, the DSP 15 reads musical sound information corresponding to the digital signal waveform from the ROM 13, writes it in a waveform memory, and performs a processing of reproducing it using a sound source. Further, the DSP 15 performs a panning 153*a* for balancing the volume of the speaker 20*a* and the speaker 20*b*. The musical sound signal that has been subjected to the panning 153*a* is input to a D/A converter 18*a*, converted into an analog signal, and amplified by a power amplifier (PW amplifier) 19*a*, and a musical sound corresponding to the musical sound signal is emitted from the speaker 20*a* connected to the PW amplifier 19*a*.

Further, the DSP 15 performs a trigger detection 151*b*, a PCM waveform reproduction 152*b*, and a panning 153*b* in the same manner as the trigger detection 151*a*, the PCM waveform reproduction 152*a*, and the panning 153*a* with respect to the digital signal input from the A/D converter 17*b*. The musical sound signal that has been subjected to the panning 153*b* is input to a D/A converter 18*b*, converted into an analog signal, and amplified by a PW amplifier 19*b*, and a musical sound corresponding to the musical sound signal is emitted from the speaker 20*b* connected to the PW amplifier 19*b*.

Further, the DSP 15 includes a delay circuit 154*a* that delays the musical sound signal input from the panning 153*a* and inputs it to the D/A converter 18*b*, and a delay circuit 154*b* that delays the musical sound signal input from the panning 153*b* and inputs it to the D/A converter 18*a*. The delay circuit 154*a* delays the musical sound signal input to the PW amplifier 19*b* so that the musical sound signal output from the panning 153*a* is input to the PW amplifier 19*b* at a timing later than the timing of being input to the PW amplifier 19*a*. Further, the delay circuit 154*b* delays the musical sound signal input to the PW amplifier 19*a* so that the musical sound signal output from the panning 153*b* is input to the PW amplifier 19*a* at a timing later than the timing of being input to the PW amplifier 19*b*.

The setting of the pannings 153*a* and 153*b* and the setting of the delay time for the delay circuits 154*a* and 154*b* may be performed by the CPU 11 by operating the operator 14 by the user. In this embodiment, the pannings 153*a* and 153*b* are set to have the same volume distribution on the left and right sides.

The struck surface Sa is an example of the "first struck surface," and the struck surface 5*b* is an example of the "second struck surface." Further, the speaker 20*a* is an example of the "first speaker," and the speaker 20*b* is an example of the "second speaker." The DSP15 (PCM waveform reproduction) is an example of the "first generation part" and the "second generation part." The musical sound signal obtained by the PCM waveform reproduction 152*a* is an example of the "first musical sound signal," and the musical sound signal obtained by the PCM waveform reproduction 152*b* is an example of the "second musical sound signal." Further, the PW amplifier 19*a* is an example of the "first amplifier," and the PW amplifier 19*b* is an example of the "second amplifier." The delay circuit 154*a* is an example of the "first delay circuit," and the delay circuit 154*b* is an example of the "second delay circuit."

According to the above configuration, when the struck surface 5*a* on the left side is hit, the corresponding musical sound is emitted from the speaker 20*a* on the left side, and the same musical sound is emitted from the speaker 20*b* on the right side later than the timing of that emission. As a result, the sound image of the musical sound is localized on the left side (struck surface 5*a*), and it is possible to obtain an auditory perception that the sound is emitted from the struck surface 5*a*. When the struck surface 5*b* on the right side is hit, the corresponding musical sound is emitted from the speaker 20*b* on the right side, and the same musical sound is emitted from the speaker 20*a* on the left side later than the timing of that emission. As a result, the sound image of the musical sound is localized on the right side, and it is possible to obtain an auditory perception that the sound is emitted from the struck surface 5*b*. In the above, in the amplifier control in the PCM waveform reproduction of the DSP 15, the volume is controlled to be the same on the left and right sides. As a result, musical sounds are emitted from the speakers 20*a* and 20*b* at the same volume. This makes it possible to hear a louder sound than when a difference is provided between the left and right volumes for localization.

Figure 4:
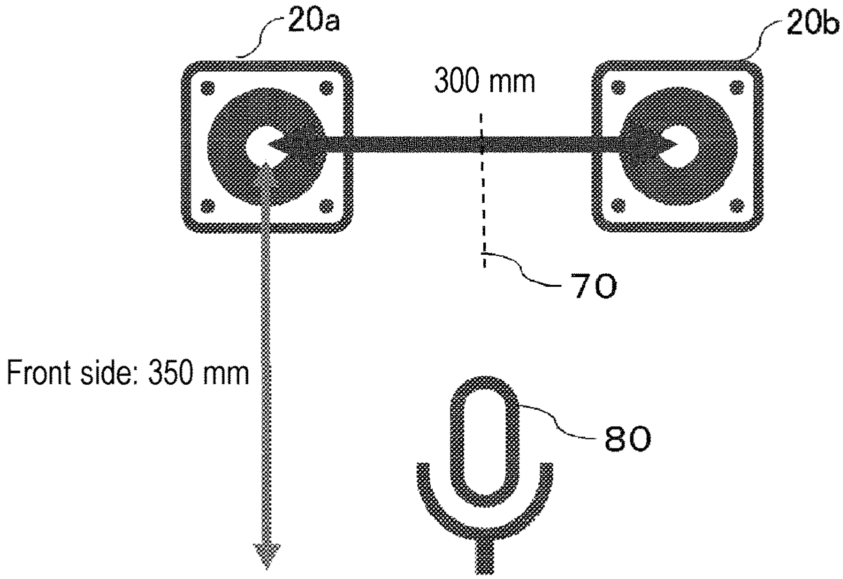
In FIG. 4, (A) and (B) are illustration diagrams of the experiment.
Figure 4:
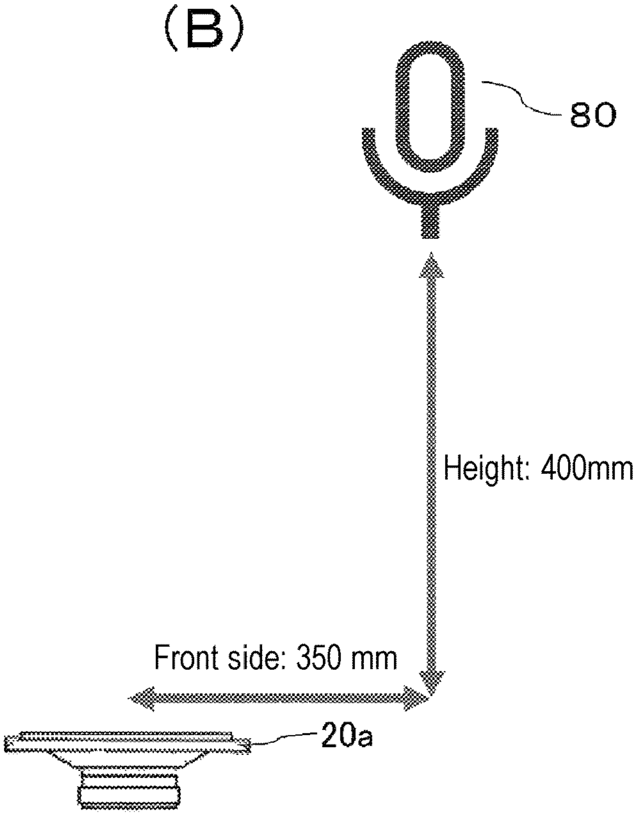

(A) of FIG. 4 shows the experimental conditions for investigating the relationship between the sense of localization and the delay time. The speaker 20*a* and the speaker 20*b* are disposed in the left-right direction so that the distance between the centers thereof is 30 mm. A microphone 80 assumed to be the listener's ear is disposed on a straight line 70 that makes the speaker 20*a* and the speaker 20*b* symmetrical in the left-right direction ((A) of FIG. 4). As shown in (B) of FIG. 4, the microphone is disposed at a height of 40 mm from a position 350 mm in front of the center of the speakers 20*a* and 20*b*.

Figure 6:
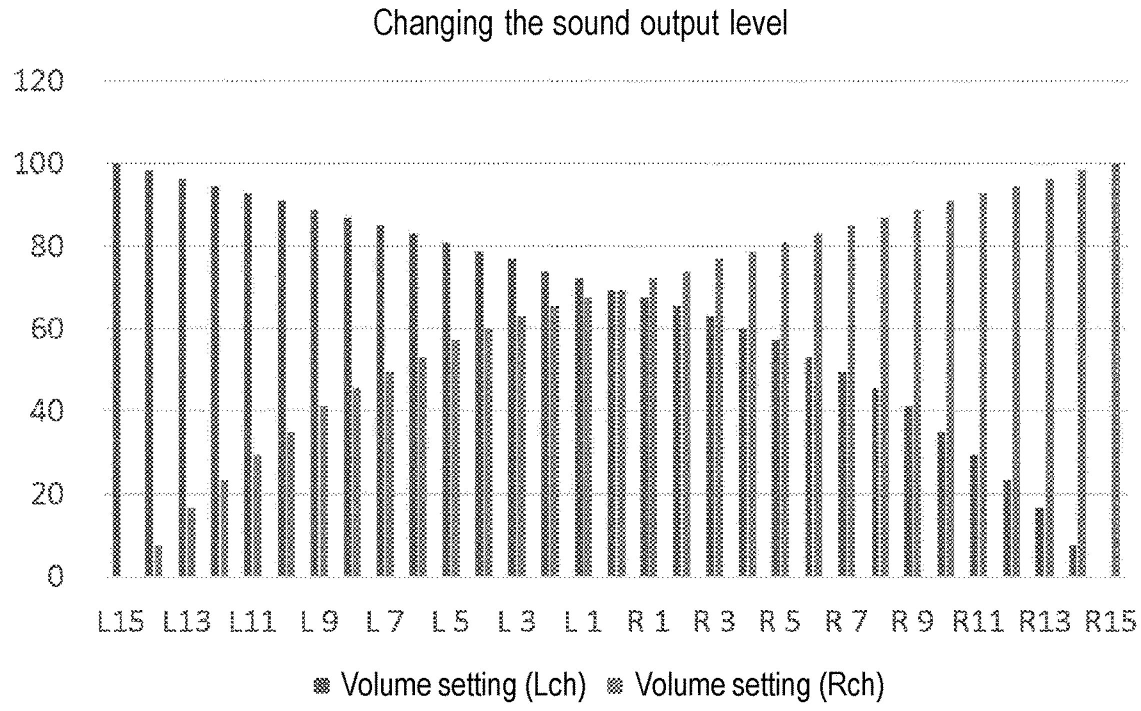
In FIG. 6, (A) and (B) are graphs illustrating the first method.
Figure 6:
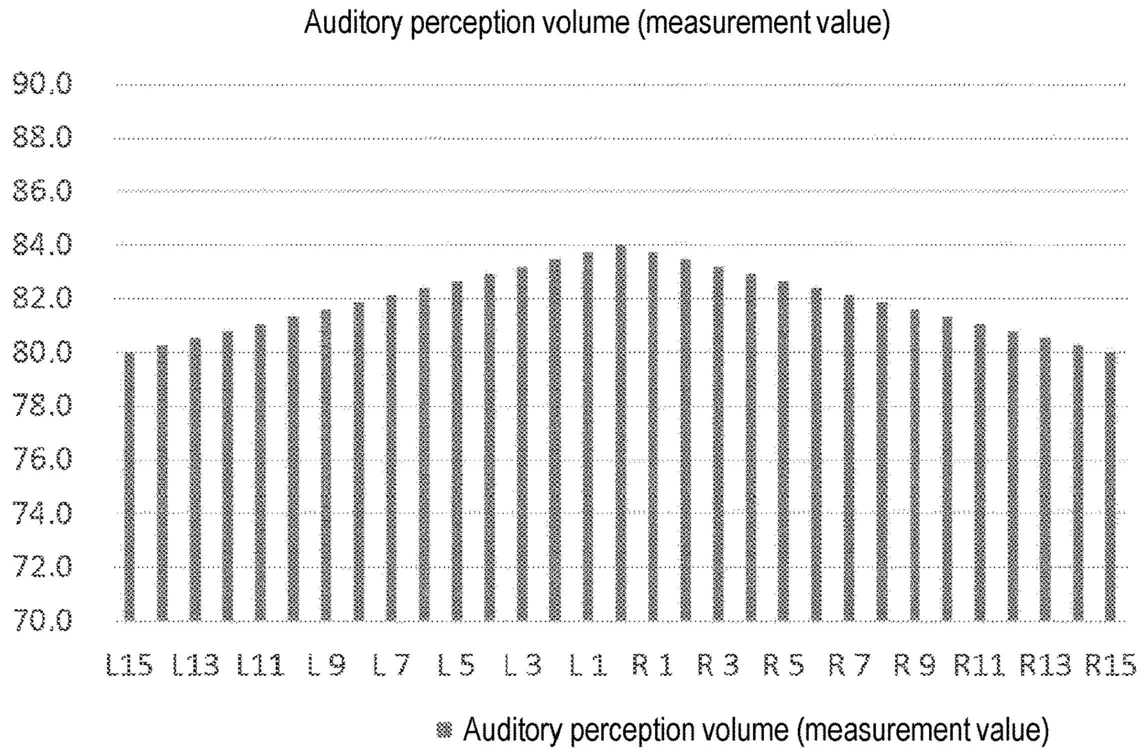

FIG. 5 is a table showing the experimental results of a first method. In FIG. 6, (A) and (B) are graphs illustrating the first method. As the first method (comparative example), a configuration in which the delay circuits 154*a* and 154*b* have been removed from the configuration shown in FIG. 2 is used. That is, a configuration is adopted in which the musical sound signals corresponding to the hits of the struck surface 5*a* and the struck surface 5*b* are output from both the speakers 20*a* and 20*b*, but the signal transmission to the opposite side is not delayed.

The left-right direction is divided into the center (CTR), regions L1 to L15 of the struck surface 5*a* in the left-right direction, and regions R1 to R15 of the struck surface 5*b* in the left-right direction, and when each of regions L1 to L15 and regions R1 to R15 is hit, the output levels (volumes) of the left and right sounds are made different and output (FIG. 5 and (A) of FIG. 6). In this case, the volume of the auditory perception tends to be loudest in the center and decreases as the distance increases ((B) of FIG. 6).

Figure 8:
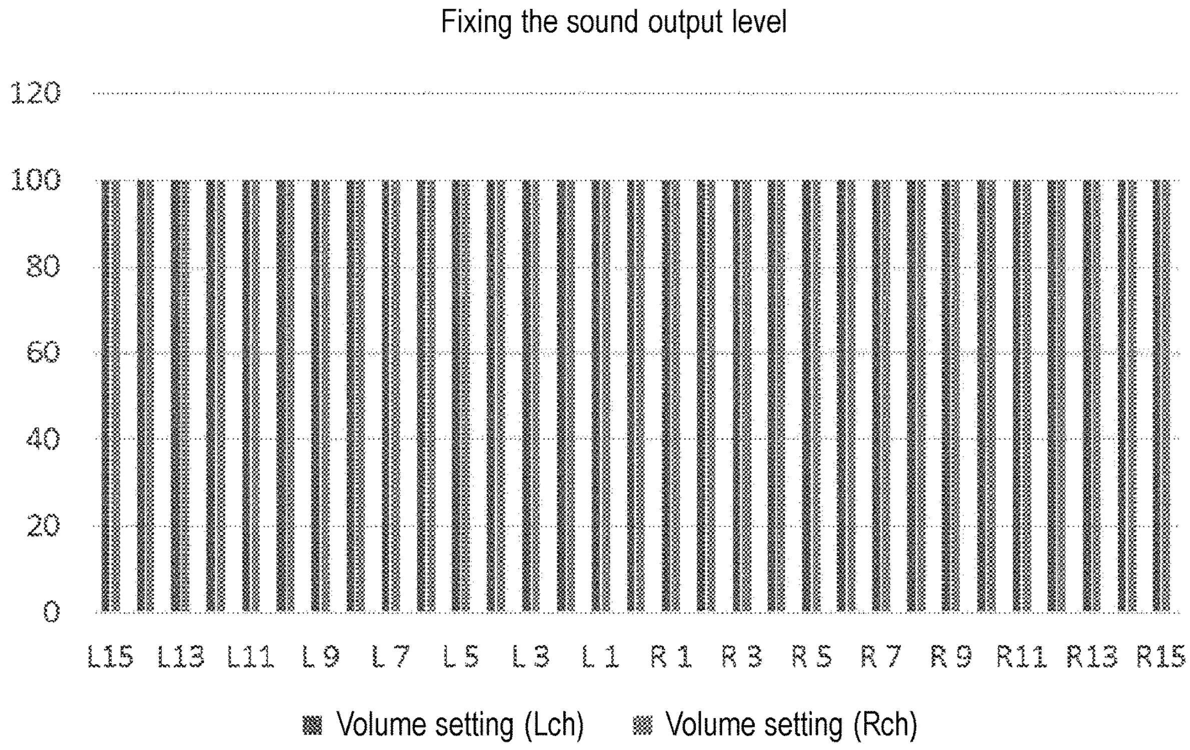
FIG. 8 is a graph illustrating the second method.
Figure 9:
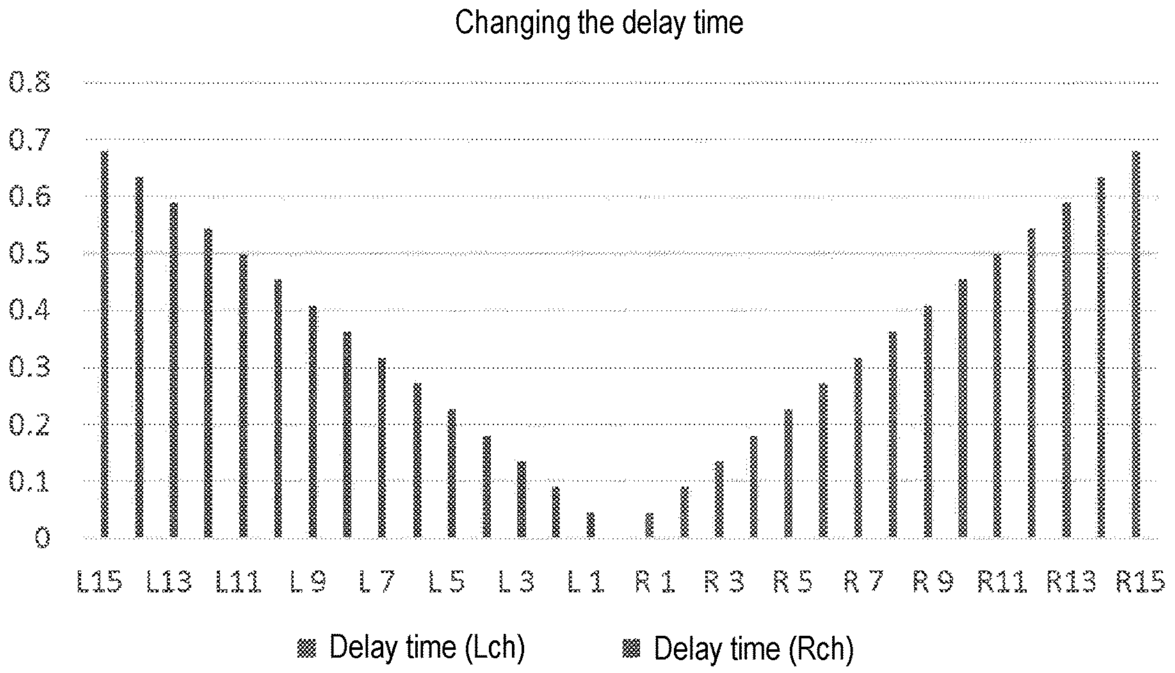
FIG. 9 is a graph illustrating the second method.
Figure 9:
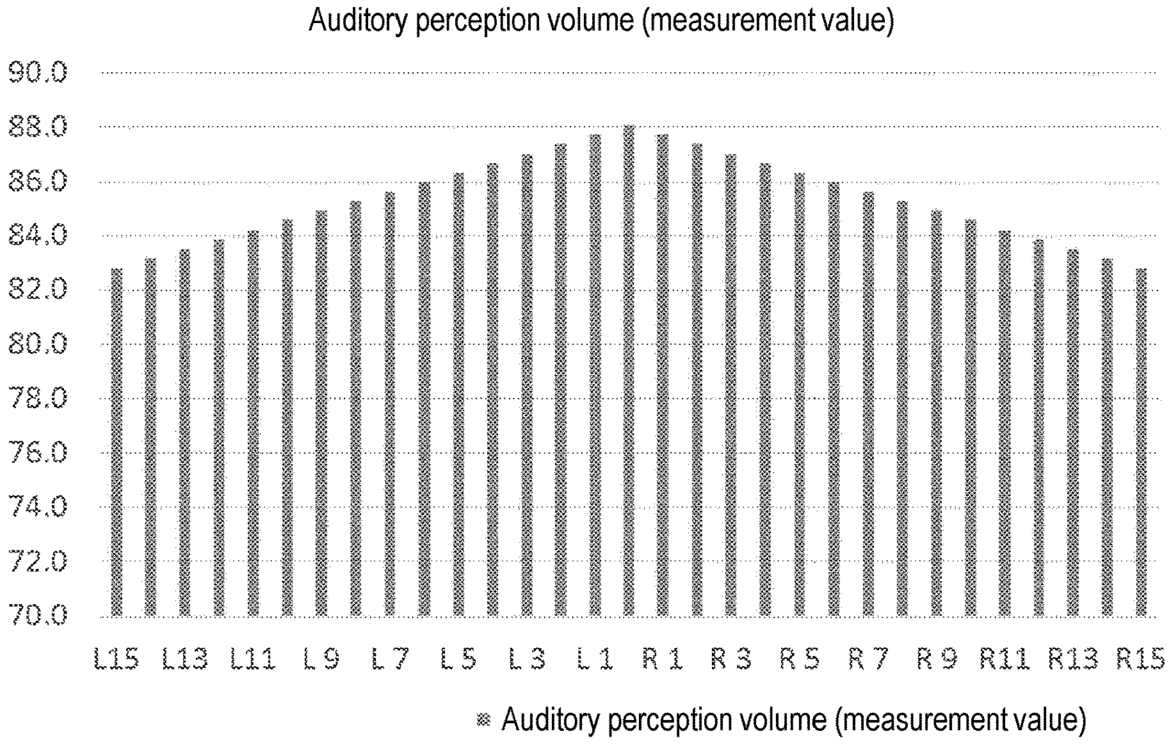

FIG. 7 is a table showing the experimental results of a second method, and FIGS. 8 and 9 are graphs illustrating the second method. In the second method, the configuration shown in FIG. 2, that is, the configuration using the delay circuits 154*a* and 154*b* is used. Similar to the first method, it is divided into the center (CTR), the regions L1 to L15 of the struck surface 5*a* and the regions R1 to R15 of the struck surface 5*b*. However, in the second method, the sound output level (volume) is fixed at the same level (FIG. 8). In addition, the delay time is adjusted to be longer as the distance from the center increases (FIG. 9). As for the volume of the auditory perception, as shown in (B) of FIG. 9, the center is the largest, and the tendency to decrease as the distance from the center increases is the same as in the first method, but it can be seen that the volume of the auditory perception is generally higher than that of the first method ((B) of FIG. 6), and the volume can be increased as a whole.

As described above, from the second method, the following can be said about the relationship between the sense of localization and the delay time.

When the delay time is 0 ms, it feels as if the sound is coming from the center (CTR) between the speakers.

If the delay time is lengthened, it feels as if the localization position moves until a certain delay time.

The maximum delay time at which the Haas effect is obtained is measured while fixing the distance between the speakers and confirming the localization with the ears. The Haas effect is a psychological phenomenon of the auditory perception that perceives the position of the sound image in the direction of the signal that reaches the ear early. In the result of the second method, a sense of localization from the actual speaker position is obtained at the maximum delay time (0.68 ms). Even if the delay time is set to be the maximum delay time or more, the sense of localization beyond the position of the speaker is not obtained.

As described above, in the electronic percussion instrument 1, while the volume is the same, in the signal transmission to the left and right speakers, the signal for the speaker on the opposite side to the struck surface is delayed, so that the sound image can be localized on the side of the struck surface that has been hit, while the volume can be raised as a whole. As a result, the musical sound can be preferably heard. Further, in the electronic percussion instrument according to the embodiment, the localization position of the sound image of the sound emitted from the two speakers can be changed (adjusted) by changing the delay time set by the CPU 11 in the delay circuit. The configurations shown in the embodiments may be appropriately combined in the range not deviating from the purpose.

Further, an embodiment of the disclosure may provide a program for causing a computer to execute processing performed by an electronic percussion instrument.

What is claimed is:

1. An electronic percussion instrument comprising:

a first housing having a first struck surface and a first piezo sensor that converts a vibration of the first struck surface into an electric signal;

a first speaker disposed inside the first housing and on a back side of the first struck surface and in a range in which the first struck surface is projected in a direction perpendicular to the first struck surface;

a second housing having a second struck surface and a second piezo sensor that converts a vibration of the second struck surface into an electric signal, wherein the second struck surface is disposed side by side with the first struck surface;

a second speaker disposed inside the second housing and on the back side of the second struck surface and in a range in which the second struck surface is projected in a direction perpendicular to the second struck surface;

a first generation part that generates a first musical sound signal based on the electric signal indicating the vibration of the first struck surface caused by a hit on the first struck surface;

a second generation part that generates a second musical sound signal based on the electric signal indicating the vibration of the second struck surface caused by a hit on the second struck surface;

a first amplifier that amplifies the first musical sound signal or the second musical sound signal and connects with the first speaker;

a second amplifier that amplifies the first musical sound signal or the second musical sound signal and connects with the second speaker; a first delay circuit that delays the first musical sound signal input to the second amplifier so that the first musical sound signal is input to the second amplifier at a timing later than a timing of being input to the first amplifier; and a second delay circuit that delays the second musical sound signal input to the first amplifier so that the second musical sound signal is input to the first amplifier at a timing later than a timing of being input to the second amplifier.

2. The electronic percussion instrument according to claim 1, wherein each of the first speaker and the second speaker emits a musical sound based on the first musical sound signal at a same volume.

3. The electronic percussion instrument according to claim 1, wherein each of the first speaker and the second speaker emits a musical sound based on each of the first musical sound signal and the second musical sound signal at a same volume.

4. The electronic percussion instrument according to claim 1, wherein the first struck surface and the second struck surface are disposed side by side in a left-right direction.

5. A control device for an electronic percussion instrument including a first housing and a second housing, wherein the first housing has a first struck surface and a first piezo sensor that converts a vibration of the first struck surface into an electric signal, and the second housing has a second struck surface disposed side by side with the first struck surface and a second piezo sensor that converts a vibration of the second struck surface into an electric signal, the control device comprising:

a first generation part that generates a first musical sound signal based on the electric signal indicating the vibration of the first struck surface caused by a hit on the first struck surface; a second generation part that generates a second musical sound signal based on the electric signal indicating the vibration of the second struck surface caused by a hit on the second struck surface;

a first delay circuit that delays the input first musical sound signal;

a second delay circuit that delays the input second musical sound signal, wherein the first musical sound signal is input to a first amplifier that amplifies a signal to be connected to a first speaker disposed inside the first housing and on a back side of the first struck surface and in a range in which the first struck surface is projected in a direction perpendicular to the first struck surface, and is input to a second amplifier that amplifies a signal to be connected to a second speaker disposed inside the second housing and on the back side of the second struck surface and in a range in which the second struck surface is projected in a direction perpendicular to the second struck surface at a timing later than a timing of being input to the first amplifier by the first delay circuit, wherein the second musical sound signal is input to the second amplifier, and is input to the first amplifier at a timing later than a timing of being input to the second amplifier by the second delay circuit.

6. A control method for an electronic percussion instrument, wherein a control device for the electronic percussion instrument comprising a first housing and a second housing, wherein the first housing has a first struck surface and a first piezo sensor that converts a vibration of the first struck surface into an electric signal, and the second housing has a second struck surface disposed side by side with the first struck surface and a second piezo sensor that converts a vibration of the second struck surface into an electric signal, performs:

generating a first musical sound signal based on the electric signal indicating the vibration of the first struck surface caused by a hit on the first struck surface; and inputting the first musical sound signal to a first amplifier that amplifies a signal to be connected to a first speaker disposed inside the first housing and on a back side of the first struck surface and in a range in which the first struck surface is projected in a direction perpendicular to the first struck surface, and inputting the first musical sound signal to a second amplifier that amplifies a signal to be connected to a second speaker disposed inside the first housing and on the back side of the second struck surface and in a range in which the second struck surface is projected in a direction perpendicular to the second struck surface at a timing later than a timing of being input to the first amplifier, generating a second musical sound signal based on the electric signal indicating the vibration of the second struck surface caused by a hit on the second struck surface; and inputting the second musical sound signal to the second amplifier, and inputting the second musical sound signal to the first amplifier at a timing later than a timing of being input to the second amplifier.

7. The control device for the electronic percussion instrument according to claim 5, wherein each of the first speaker and the second speaker emits a musical sound based on the first musical sound signal at a same volume.

8. The control device for the electronic percussion instrument according to claim 5, wherein each of the first speaker and the second speaker emits a musical sound based on each of the first musical sound signal and the second musical sound signal at a same volume.

9. The control device for the electronic percussion instrument according to claim 5, wherein the first struck surface and the second struck surface are disposed side by side in a left-right direction.

10. The control device for the electronic percussion instrument according to claim 8, wherein the first struck surface and the second struck surface are disposed side by side in a left-right direction.

11. The control method for the electronic percussion instrument according to claim 6, wherein each of the first speaker and the second speaker emits a musical sound based on the first musical sound signal at a same volume.

12. The control method for the electronic percussion instrument according to claim 6, wherein each of the first speaker and the second speaker emits a musical sound based on each of the first musical sound signal and the second musical sound signal at a same volume.

13. The control method for the electronic percussion instrument according to claim 6, wherein the first struck surface and the second struck surface are disposed side by side in a left-right direction.

14. The control method for the electronic percussion instrument according to claim 12, wherein the first struck surface and the second struck surface are disposed side by side in a left-right direction.

15. The electronic percussion instrument according to claim 3, wherein the first struck surface and the second struck surface are disposed side by side in a left-right direction.

* * * * *